UNITED STATES PATENT OFFICE.

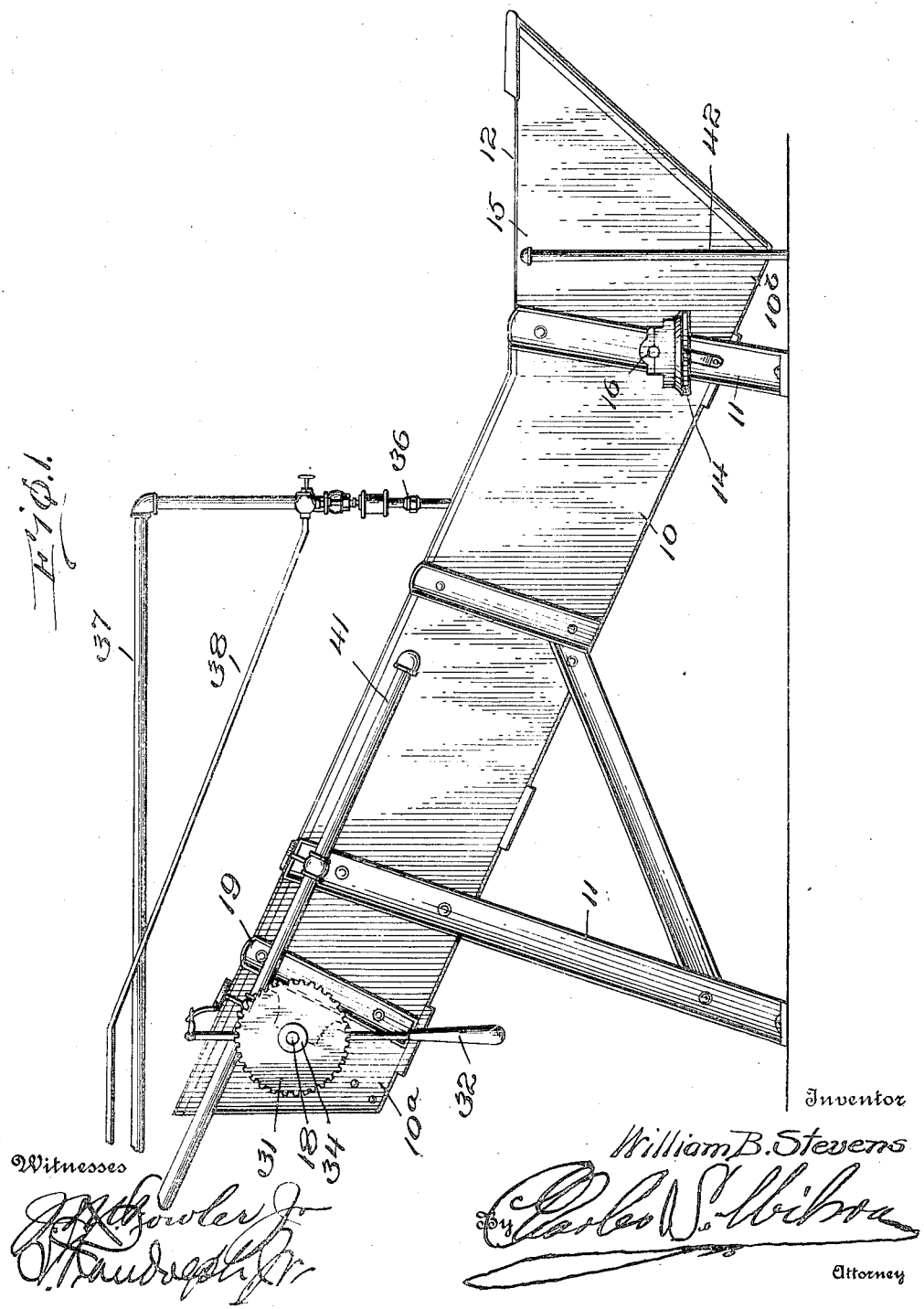

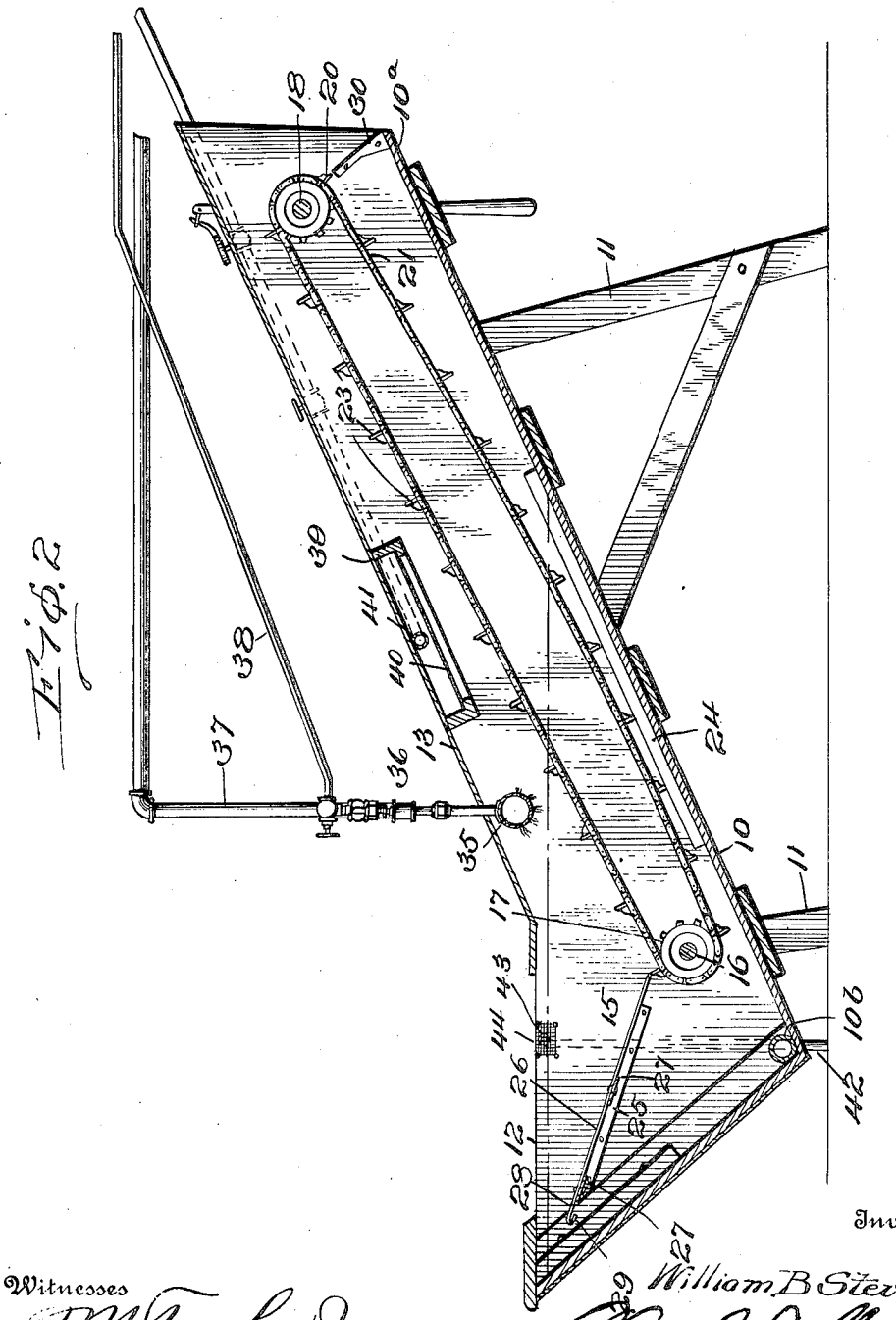

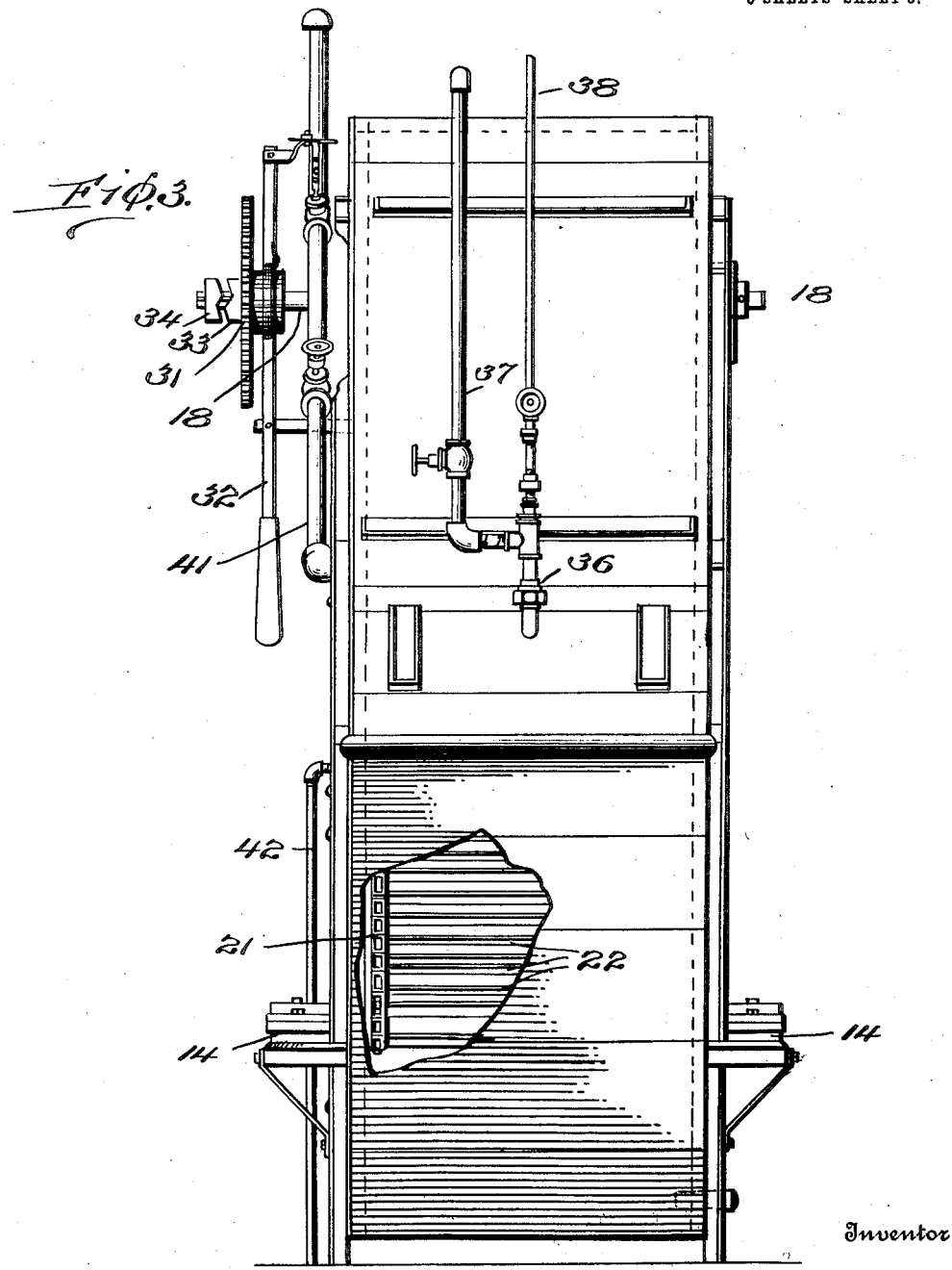

WILLIAM B. STEVENS, OF TRAPPE, MARYLAND.

SCALDING-MACHINE.

1,104,571.

Specification of Letters Patent. Patented July 21, 1914.

Application filed February 29, 1912. Serial No. 680,647.

*To all whom it may concern:*

Be it known that I, WILLIAM B. STEVENS, a citizen of the United States, residing at Trappe, in the county of Talbot and State of Maryland, have invented certain new and useful Improvements in Scalding-Machines, of which the following is a specification.

This invention relates to scalding machines, and particularly to that class of machines known as tomato scalders. Heretofore, in the construction of tomato scalders, it has been customary to place a series of transversely arranged pipes in a casing, the vegetables or tomatoes being carried under these pipes. These pipes are, naturally spaced from one another and, after the tomatoes have passed under one pipe they are not acted upon by the water or steam, until they reach the next pipe thus causing an uneven steaming. In addition to this, the water or steam comes directly from the pipes and drives directly upon the tomatoes in such a manner that the same are greatly mutilated.

It is the object of the present invention to eliminate these objectionable features by submitting the tomatoes to an even flow of steam which will be distributed in such a manner that the vegetables will pass through an entire area of predetermined length, wherein they will be acted upon by steam throughout the entire distance.

It is also the further object of the present invention to inject the steam into the tank in such a manner that the same will not bear directly upon the vegetables, in order to eliminate the mutilation.

It is also the object of the present invention to provide a means whereby the tomatoes are initially placed in water, thus partially soaking the same previous to subjecting them to steam.

With the above and other objects in view, my invention consists in the construction, combination, and arrangement of the several parts, all as will be hereinafter and in detail described.

Figure 1 is a side elevation of the machine constructed in accordance with the present invention. Fig. 2 is a central longitudinal section thereof. Fig. 3 is a front elevation thereof, parts thereof, being broken away.

The scalding machine forming the subject matter of the present invention comprises a tank having one end elevated, mounted upon suitable supports, and provided at its lower end with a feed opening. An endless conveyer is disposed within the tank and is adapted to receive the vegetables or fruit at the feed opening and carry the same upwardly through the tank, said vegetables or fruit being primarily subjected to a spray of water and then to a spray of scalding steam during the passage through the tank.

Reference being had more particularly to the drawings, 10 indicates a casing or tank having one end $10^a$ elevated and the other end $10^b$ depressed, said tank being supported by suitable legs 11. The upper side of the casing or tank 10 adjacent to the lower end thereof, is substantially horizontal and is provided with a feed opening 12 in the cover 13 of the tank. The lower end of the casing slopes upwardly toward the horizontal portion 12 of the cover 13 and is adapted to provide a guide whereby the vegetables are fed onto the carrier. A bearing 14 is mounted upon each leg 11 adjacent to the feed compartment indicated generally at 15, said bearings each having journaled therein a shaft 16 which extends transversely through the tank adjacent the lower end thereof. This shaft 16 is provided with sprocket wheels 17 near the opposite ends thereof, within the tank. A shaft 18 is journaled adjacent the upper end of the tank upon braces 19, said shaft extending transversely through the casing or tank 10, and provided with the sprocket wheels 20 adjacent each end thereof, and operable inside the tank. Sprocket chains 21 pass around the sprocket wheels 17 and 20 to support and operate the conveyer. These chains 21 are connected by a series of transversely arranged slats 22 which are provided with the upwardly extending vanes 23 for the engagement of the vegetables. In order to strengthen and support the lower stretch of each of the chains 21, a board 24 is mounted upon the bottom of said tank or casing as shown in Fig. 2.

The sides of the feed compartment 15 are provided with obliquely arranged angle bars 25, said angle bars being adapted to receive a grate 26 constructed of a series of slats which incline from the conveyer 17 to a point adjacent to the outer side of the feed opening 12. This grate is provided with a series of transversely arranged bars 27 to which are secured a series of slats 28, said slats being provided at their upper terminals with the hooks 29 which engage suitable supports extending across the feed chamber.

The tomatoes are dumped through the feed openings 12 and will sink upon the grate 26 to be conducted to the conveyer by gravity. The upper terminal of the tank 10 is open for the delivery of the tomatoes and is provided with an inwardly sloping guide 30 upon which the tomatoes are placed after the carrier has delivered the same, and by means of which they are conducted from the tank.

In order to provide a means whereby the shaft 18 may be rotated, thereby imparting a movement to the interior mechanism, a gear or pulley 31 is slidably and loosely mounted thereon, and connected to any suitable source of power, said gears or pulley being operated by a suitable lever 32. The outer surface of the gear or pulley 31 is provided with a clutch member 33 which is adapted to coöperate with the clutch member 34, rigidly keyed to the shaft 18 at the outer terminal thereof, when it is desired to rotate the shaft 18. The scalding mechanism, which operates upon the tomatoes or vegetables as they pass through the tank 10 upon the carrier heretofore described, constitutes primarily, a transversely arranged pipe 35 mounted within the casing or tank 10, above the carrier and adjacent to the lower terminal thereof, the said pipe being provided with perforations, and extending across said tank. The supply pipe 36 is centrally secured to the pipe 35 in such a manner that the water passing through the supply pipe into the pipe 35 is equably supplied thereby. The supply pipe 36 is connected to a water supply pipe 37 through the instrumentality of which the water is fed into the pipe 36 and from which it advances into the pipe 35. In order to impart the necessary force to the water passing from the pipe 37 into the pipe 36, and in addition thereto, to partially heat said water, a steam pipe 38 is connected to the joint between the pipe 37 and the pipe 36. This pipe 35 is adapted to feed luke warm water upon the tomatoes or vegetables, thereby thoroughly washing the same and partially loosening their skins. This operation is done primarily and previous to subjecting the tomatoes to the action of the scalding steam.

A steam box 39 is mounted on the interior surface of the cover 13 of the tank 10 above the pipe 35 and is provided with a perforated closure upon its inner surface. This box 39 is somewhat elongated for the purpose of giving sufficient space for the steam to operate upon the tomatoes or vegetables which pass directly under the box 39. The steam supply pipe 41 enters one side of the box 39 and is adapted to keep a standing pressure of steam within said box throughout its entire area. From this construction it will clearly be seen that the steam entering the box 39 is equally distributed throughout the entire space thereof and will pass through the plate 40 at an even pressure operating upon all the tomatoes with the same pressure and with the same quantity of steam. It is also noted that as the tomatoes pass under the box 39 every tomato will be operated upon by the steam for a pre-determined period of time dependent upon the speed at which the carrier is operated and also upon the length of the box 39.

A drain pipe 42 enters the feed compartment 15 adjacent to the upper side thereof as at 43, the opening to the said drain pipe being covered by the screen 44. It will clearly be seen from the foregoing that, owing to the slope of the tank 10 the water level will be under the broken line shown in Fig. 2 and that the tomatoes as they are placed within the feed compartment 15 will be immersed in water of a warm temperature previous to being received upon the carrier. This not only washes the tomatoes of any dirt which may be thereon, but also primarily soaks them before subjecting them to the clean water.

Having thus fully described my invention, what I claim as new and desire to secure by United States Letters Patent is:—

A machine for scalding vegetables and fruit comprising a tank, a cover for said tank, an inclined conveyer within the tank under the cover, means for moving said conveyer longitudinally of said tank, a steam box supported underneath the cover and over the conveyer in said tank, said box extending across approximately the entire width of the conveyer and extending a substantial distance lengthwise of said conveyer, said box having a perforated bottom, and a pipe leading into said steam box, whereby the vegetables or fruit conveyed beneath the steam box will be exposed to an even flow of steam from the steam box through a considerable portion of the travel thereof.

In testimony whereof I affix my signature in presence of two witnesses.

WILLIAM B. STEVENS.

Witnesses:
R. RASTALL WALKER,
J. H. JONES, Jr.